(12) United States Patent
Alexandersson et al.

(10) Patent No.: US 8,416,264 B2
(45) Date of Patent: Apr. 9, 2013

(54) METHOD AND DEVICE FOR OPTIMIZING AN IMAGE DISPLAYED ON A SCREEN

(75) Inventors: Ulf P. Alexandersson, Lund (SE); Karl O. Thorn, Malmo (SE)

(73) Assignee: Sony Mobile Communications AB, Lund (SE)

( * ) Notice: Subject to any disclaimer, the term of this patent is extended or adjusted under 35 U.S.C. 154(b) by 748 days.

(21) Appl. No.: 12/263,529

(22) Filed: Nov. 3, 2008

(65) Prior Publication Data

US 2010/0110108 A1    May 6, 2010

(51) Int. Cl.
*G09G 5/00*    (2006.01)

(52) U.S. Cl.
USPC .......................................... 345/660; 345/629

(58) Field of Classification Search .................. 345/660, 345/629; 455/414.1; 382/181; 715/866
See application file for complete search history.

(56) References Cited

U.S. PATENT DOCUMENTS

| | | | |
|---|---|---|---|
| 2003/0095135 | A1 | 5/2003 | Kaasila et al. |
| 2006/0126932 | A1 | 6/2006 | Eschbach |
| 2009/0305680 | A1* | 12/2009 | Swift et al. ............... 455/414.1 |

FOREIGN PATENT DOCUMENTS

CN    1488120 A    4/2004

OTHER PUBLICATIONS

Erol et al., "Multimedia Clip Generation From Documents for Browsing on Mobile Devices", IEEE Transactions on Multimedia, vol. 10, No. 5, Aug. 2008.

International Search Report and Written Opinion for International Application No. PCT/EP2009/054964 dated Aug. 11, 2009.

"Multimedia Clip Generation From Documents for Browsing on Mobile Devices", IEEE Transactions on Multimedia, vol. 10, No. 5, Aug. 2008 by Berna Erol, Kathrin Berkner and Siddharth Joshi.

* cited by examiner

*Primary Examiner* — Chante Harrison

(74) *Attorney, Agent, or Firm* — Renner, Otto, Boisselle & Sklar, LLP

(57) ABSTRACT

A method and electronic device is provided for optimizing an image displayed on a screen on the electronic device. The size of the image is maximized in relation to the size of the screen and readability of the text in the image is determined by using graphic parameters.

17 Claims, 5 Drawing Sheets

METHOD AND DEVICE FOR OPTIMIZING AN IMAGE DISPLAYED ON A SCREEN

TECHNICAL FIELD

The present invention relates in general to a method and a device for optimizing an image or video displayed on a screen. More particularly, the present invention relates to presentation of text in images or video streams displayed on a screen.

BACKGROUND ART

Portable electronic devices are commonly used today for various personal and work-related purposes. Such portable devices are, for example, mobile phones, personal digital assistants (PDA's), media players and digital cameras. Portable electronic devices are increasingly popular because they are easy to carry and use in remote locations.

Today the portable devices are commonly used when consuming or ordering different products, e.g. music albums, movies online. These products are often found by browsing through images, since it is sometimes easier to recall an image rather than remembering e.g. the title or the name of an artist.

In order to achieve portability, many portable devices use user interfaces for presenting various display screens to the user for interaction that is mostly visual. Users can interact with the user interfaces to navigate the display screen to thereby access functions on the portable device. However, these user interfaces can be difficult to use at times for various reasons. One reason is that the display screens tend to be small in size and form factor and therefore difficult to see. Another reason is that a user may have poor reading vision or otherwise be visually impaired.

This is solved by presenting the images on the display screens as big as possible. However, this gives less space for navigation controls, e.g. touch play/stop and title text etc.

Since the title or product name is rather important a related text portion is presented on the image, which often leads to double text.

SUMMARY OF THE INVENTION

With the above description in mind, then, an aspect of some embodiments of the present invention is to provide a method and device for optimizing an image displayed on a screen, which seeks to mitigate, alleviate or eliminate one or more of the above-identified deficiencies in the art and disadvantages singly or in any combination.

An aspect of the present invention relates to a method for optimizing an image displayed on a screen on an electronic device. The method may comprise the steps of retrieving metadata associated with the image, performing character recognition (CR) on the image for identifying at least one character in the image, comparing the determined at least one character with the retrieved metadata, maximizing size of the image in relation to the size of the screen and determining readability of the at least one character in the image by using graphic parameters.

Another aspect of the present invention relates to an electronic device comprising means for optimizing an image displayed on a screen on the electronic device. The device may comprise means for retrieving metadata associated with the image, means for performing character recognition (CR) on the image and for identifying at least one character in the image, means for comparing the determined at least one character with the retrieved metadata, means for maximizing the size of the image in relation to the size of the screen and means for determining readability of the at least one character in image by using graphic parameters. The graphic parameters may be any of the following types; font size, cropping, contrasts or colour.

Some embodiments of the invention provide an algorithm for optimizing the presentation of an image. It is an advantage with some embodiments of the invention that they may allow for displaying big images of album covers when browsing albums and big product shots when shopping via a mobile phone.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

Embodiments of the present invention relate, in general, to the field of portable electronic devices, such as a mobile phone, including one or more input devices. However, it should be appreciated that the invention is as such equally applicable to electronic devices, such as mobile phones, personal digital assistants (PDA's), media players and digital cameras. However, for the sake of clarity and simplicity, most embodiments outlined in this specification are related to mobile phones.

Embodiments of the present invention will be described more fully hereinafter with reference to the accompanying drawings, in which embodiments of the invention are shown. This invention may, however, be embodied in many different forms and details and should not be construed as limited to the embodiments set forth herein. Rather, these embodiments are provided so that this disclosure will be thorough and complete, and will fully convey the scope of the invention to those skilled in the art. Like reference signs refer to like elements throughout.

Figure 1:
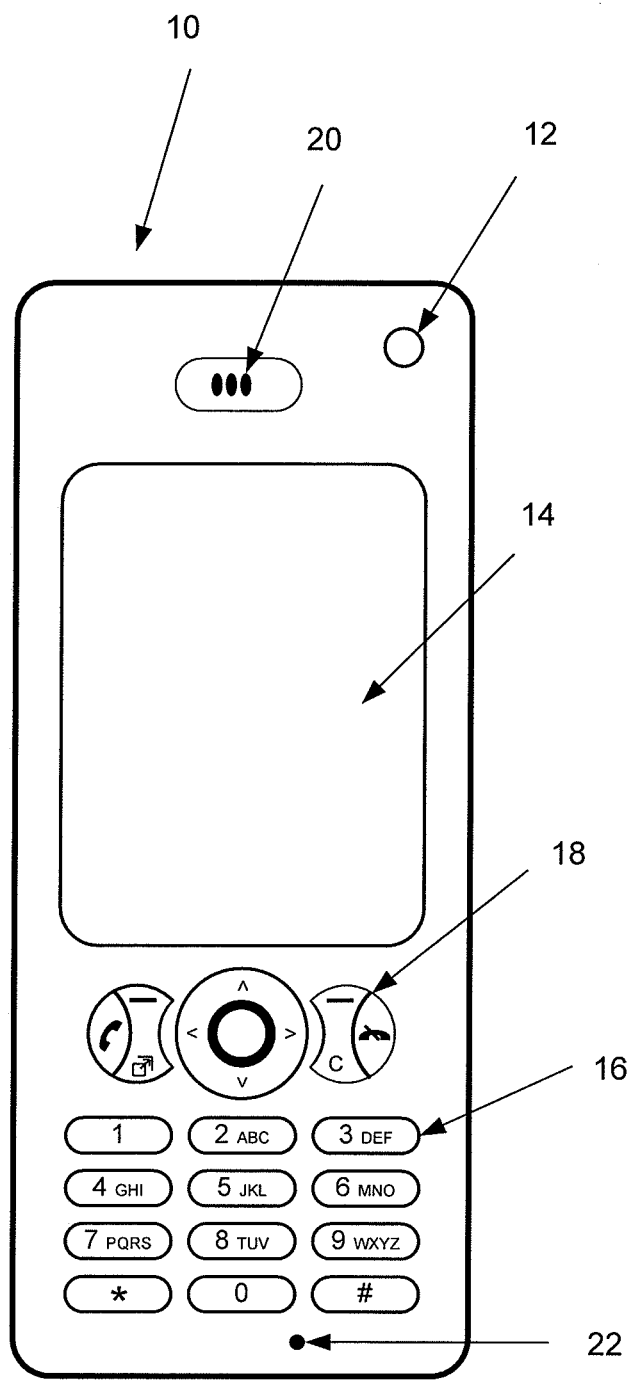
FIG. 1 is an illustration of a mobile phone in accordance with the present invention.

Referring to FIG. 1, a mobile phone 10 is illustrated. The mobile phone 10 may include a user interface that enables the user easily and efficiently to perform one or more communication tasks (e.g., identify a contact, select a contact, make a telephone call, receive a telephone call, look up a telephone number, maintain various appointment logs, etc). The user interface of the mobile phone 10 generally includes one or more of the following components: a display 14, a keypad 16, function keys 18, a speaker 20, an antenna device 12 and a microphone 22.

The display 14 displays information to a user such as operating state, time, telephone numbers, contact information, various navigational menus, status of one or more functions, etc., which enable the user to utilize the various features of the mobile phone 10. The display 14 may also be used to visually display content accessible by the mobile phone 10. The displayed content may include E-mail messages, geographical information, journal information, audio and/or video presentations stored locally in memory of the mobile phone 10 and/or stored remotely from the mobile phone 10 (e.g., on a remote storage device, a mail server, remote personal computer, etc.). Such presentations may be derived, for example, from multimedia files received through E-mail messages, including audio and/or video files, from a received mobile radio and/or television signal, etc. The audio component may be broadcast to the user with a speaker 20 of the mobile phone 10. Alternatively, the audio component may be broadcast to the user though a headset speaker (not shown).

The specific function and design of the mobile phone 10 as a communication device is known to persons skilled in the art, and will therefore not be described in any greater detail herein. It should also be noted that the list of features and elements included in the mobile phone 10 is in no way exhaustive. On the contrary, while the mobile phone 10 shown and described represents only one possible embodiment, it may well comprise further features and elements providing other function.

Figure 2:
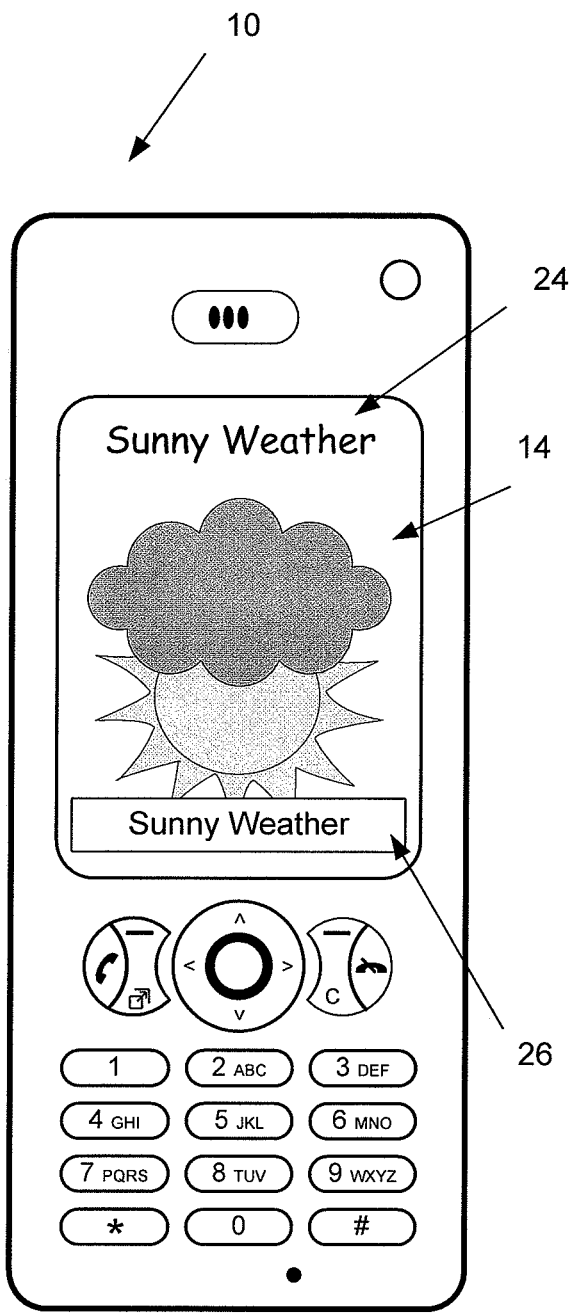
FIG. 2 is an illustration of a mobile phone with an image presented on the display in accordance with prior art.

Referring to FIG. 2, a mobile phone 10 with an image presented on the display according to prior art is illustrated. On the display an exemplary image is presented with double text, print out text 24 and text inserted 26 by an application in the mobile phone.

Figure 3:
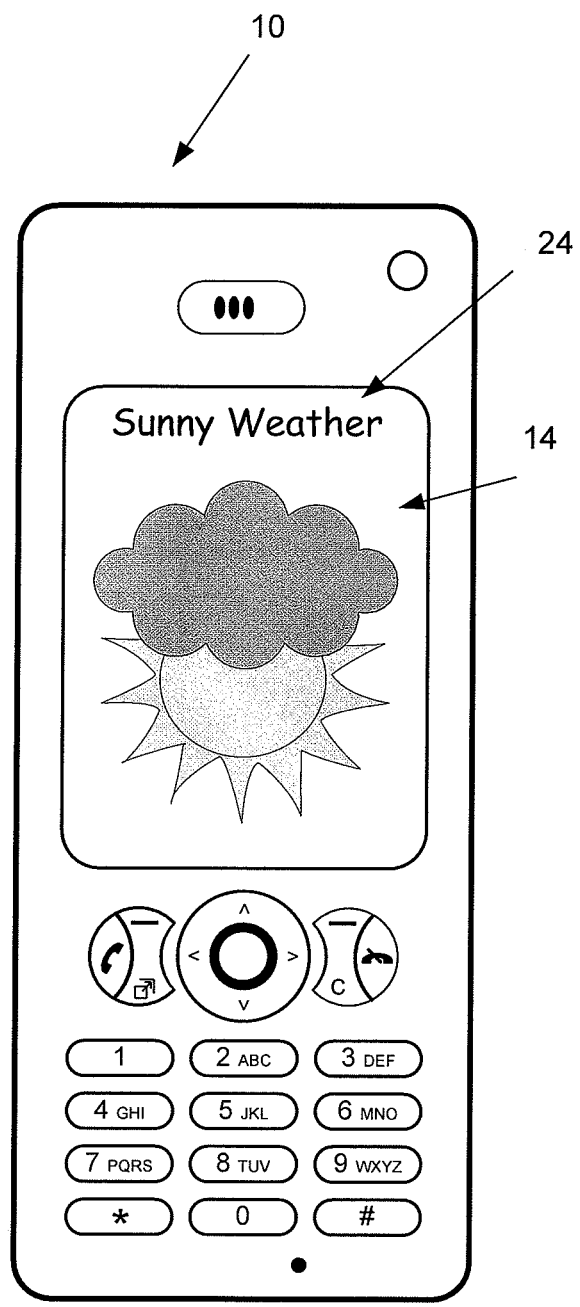
FIG. 3 is an illustration of a mobile phone with an image presented on the display in accordance with one embodiment of the present invention.

Referring to FIG. 3, a mobile phone 10 with an image presented on the display according to one embodiment of the invention is illustrated. An algorithm may be used that takes into account picture size, screen resolution and screen size and combines this with character recognition, such as optical character recognition, OCR, to determine if the print out text 24 is readable enough by using graphical parameters such as font size, cropping, color, in order to leave out the inserted text 26, as shown in FIG. 3. In order to provide the right text portion the algorithm may compare the OCR derived data expressed in the image with a database of metadata including e.g. title, name of the artist.

OCR technology as such is commonly used to determine and ensure readability of text in images, e.g. bitmapped images. This is known to persons skilled in the art, and will therefore not be described in any greater detail herein.

In one embodiment the algorithm may be expanded to be able to analyze the content of the image using face and object recognition so that text is not presented over essential parts or details (e.g. eyes) of the album cover.

Figure 4A:
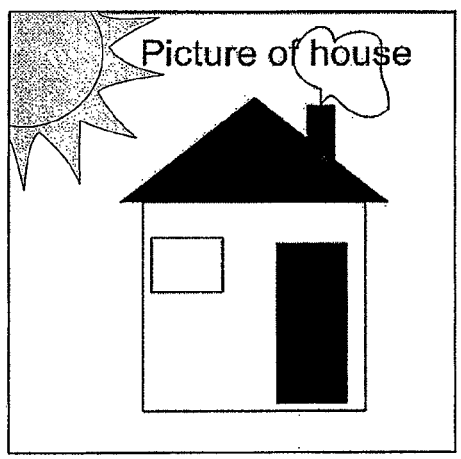
FIG. 4a-4b is an illustration of a zooming application according to the present invention.

In one embodiment the algorithm may provide for a dynamic zoom limit for zooming in or out as shown in FIG. 4a. This application may be used to stop zooming when the text is no longer readable. The user will not be able to zoom in or out any further. This can ensure that certain content cannot appear pixelated on a display.

Figure 4B:
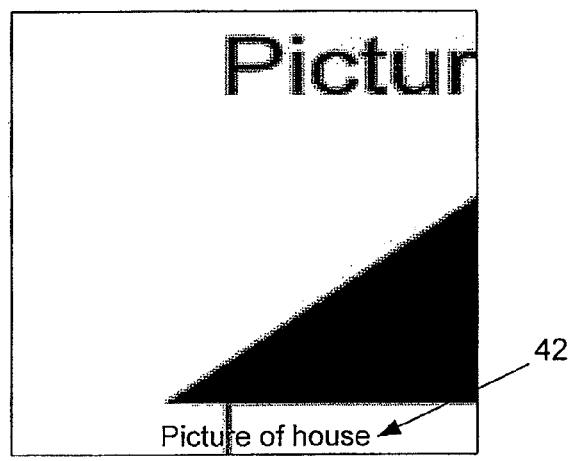
Figure 4C:
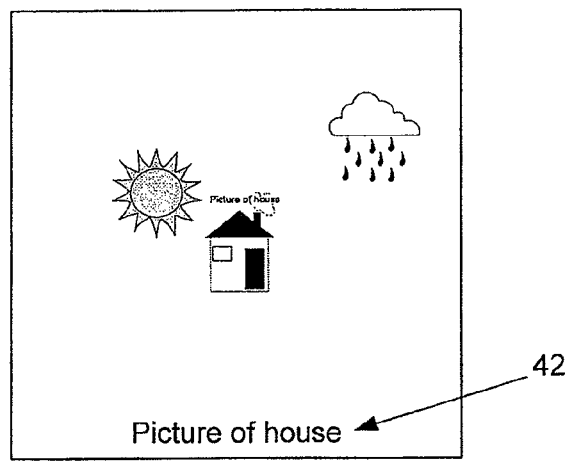

In one embodiment text may be superimposed on top of an image if the text is not readable because it is pixelated, unclear or to small to be readable, as shown in FIG. 4b-4c. As an example, the user has been zooming in a detail in the image and the text has been pixelated beyond readability, then the algorithm may provide a text 42 superimposed on top of the image, so the user still may read the text. In another example, the user has been zooming out to be able to see the whole image and the text has been to small to be read by the user, then the algorithm may provide a text 42 superimposed on top of the image, so the user still may read the text.

Figure 5:
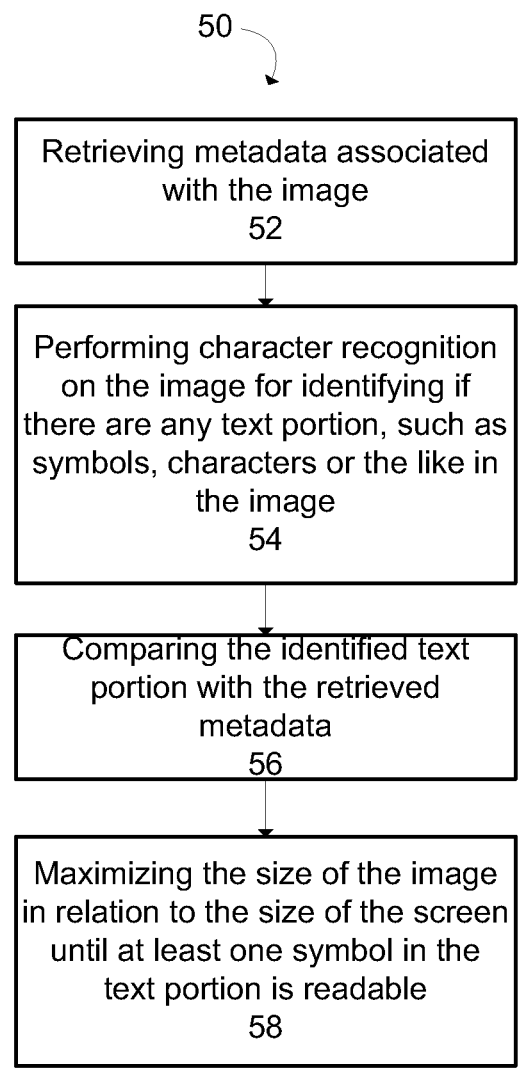
FIG. 5 is an exemplary method in accordance with aspects of the present invention.

In one embodiment, illustrated in FIG. 5, the method 50 for optimizing an image displayed on the screen of an electronic device may comprise the steps of:

retrieving metadata associated with the image, as illustrated in block 52;

performing character recognition (CR) on the image for identifying if there are any text portion, such as symbols, characters or the like in the image, as illustrated in block 54;

comparing the identified text portion with the retrieved metadata, as illustrated in block 56; and maximizing the size of the image in relation to the size of the screen until at least one symbol in the text portion is readable, as illustrated in block 58.

In one embodiment the readability of at least one symbol of the identified text portion may be determined by using graphic parameters, such as font size, cropping, contrast or color. The readability may also be preset and the size of the image may be maximized, zooming out, until readability of the identified text portion reaches the preset readability.

In one embodiment, where the determined text portion differs from the retrieved metadata, the metadata may be presented in the image. The metadata may be presented in several different ways. On way is to present the metadata on top of the image, below the image or on one of the sides of the image. The metadata may also be presented in any of following presentation ways; as permeable or non permeable text on the image, as text which is fading in or out, or in a time controlled presentation.

In one embodiment the method may comprise the step of searching the image for suitable placing of the metadata in the image when presenting the metadata, to prevent the metadata from covering any important detail in the image.

In one embodiment, wherein the readability is insufficient in relation to the graphic parameters, the size of the image may be reduced, zooming in, until the readability is sufficient. The readability may be preset and the size of the image may be reduced until readability reaches the preset readability.

In one embodiment, wherein the at least one symbol in the image is not readable, the size of the image may be reduced until all symbols in the image is readable.

The image may be presented as a still picture, e.g. an Album cover, or as a video stream. The image may also be a map or a photograph of maps.

The method above may be implemented in an electronic device, such as a mobile phone, comprising means for optimizing an image displayed on a screen on said electronic device. The device may comprise means for retrieving metadata associated with the image, means for performing character recognition (CR) on the image and for identifying at least one character in the image, means for comparing the determined at least one character with the retrieved metadata, means for maximizing the size of the image in relation to the size of the screen and means for determining readability of the at least one character in image by using graphic parameters. The graphic parameters may be any of the following types; font size, cropping, contrasts or colour.

In one embodiment the at least one character may differ from the retrieved metadata, the device may further comprise means for presenting the metadata in the image. The metadata may be presented on top of the image or on an edge of the image. Further the metadata may be presented in any of following presentation ways; as permeable character, as non permeable character in the image, as fading in or out in said image or in a time controlled presentation in the image. The device may further comprise means for searching the image for a suitable placing of the metadata in the image when presenting the metadata.

In one embodiment the readability may be insufficient in relation to the graphic parameters, the device may further comprise means for reducing the size of the image until the readability is sufficient.

In one embodiment the at least one character in image may not readable, the device further comprises means for reducing the size of the image until all characters in image is readable or means for maximizing the image until at least one character is readable.

The features of the above-mentioned embodiments can be combined in any combinations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for optimizing an image displayed on a screen on an electronic device comprising the steps of:
    retrieving metadata associated with said image;
    performing character recognition (CR) on said image for identifying at least one character in said image;
    comparing said identified at least one character with said retrieved metadata;
    maximizing size of said image in relation to the size of said screen; and
    determining readability of said identified at least one character in said maximized image by using an algorithm that uses picture size, screen resolution and screen size in combination with character recognition and graphical parameters of the identified at least one character; and
    wherein said identified and readable at least character differs from said retrieved metadata, said method further comprising the steps of:
    presenting said retrieved metadata in said image.

2. The method according to claim 1, wherein said metadata is presented on top of said image or on an edge of said image.

3. The method according to claim 1, wherein said metadata is presented in any of following presentation ways; as permeable character in said image or as non permeable character in said image.

4. The method according to claim 1, wherein said method further comprising the steps of:
    searching image for suitable placing of said metadata in said image when presenting said metadata.

5. The method according to claim 1, wherein said at least one character in image is not readable, said method further comprising the steps of:
    reducing the size of said image until all characters in image is readable.

6. The method according to claim 5, wherein readability is preset and the size of said image is reduced until readability reaches said preset readability.

7. The method according to claim 1, wherein said maximizing step further comprising:
    maximizing said image until at least one character is readable.

8. The method according to claim 7, wherein readability is preset and the size of said image is maximizes until readability reaches said preset readability.

9. The method according to claim 1, wherein the device is a mobile phone.

10. A device comprising means for optimizing an image displayed on a screen comprising:
    means for retrieving metadata associated with said image;
    means for performing character recognition (CR) on said image and for identifying at least one character in said image;
    means for comparing said identified at least one character with said retrieved metadata;
    means for maximizing the size of said image in relation to the size of said screen;
    means for determining readability of said identified at least one character in said maximized image by using an algorithm that uses picture size, screen resolution and screen size in combination with character recognition and graphical parameters of the identified at least one character; and
    wherein said identified and readable at least one character differs from said retrieved metadata, said device further comprising:
    means for presenting said retrieved metadata in said image.

11. The device according to claim 10, wherein said metadata is presented on top of said image or on an edge of said image.

12. The device according to claim 10, wherein said metadata is presented in any of following presentation ways; as permeable character or as non permeable character in said image.

13. The device according to claim 10, wherein said readability is insufficient in relation to said graphic parameters, said device further comprising:
    means for reducing the size of said image until said readability is sufficient.

14. The device according to claim 10, wherein said device further comprising:
    means for searching image for a suitable placing of said metadata in said image when presenting said metadata.

15. The device according to claim 10, wherein said at least one character in image is not readable, said device further comprising:
    means for reducing the size of said image until all characters in image is readable.

16. The device according to claim 10, wherein said means for maximizing further comprising:
    maximizing said image until at least one character is readable.

17. The device according to claim 10, wherein the device is a mobile phone.

* * * * *